UNITED STATES PATENT OFFICE.

GEORGE WOOD, OF CRAWFORD, COLORADO.

COUGH-MIXTURE.

SPECIFICATION forming part of Letters Patent No. 382,850, dated May 15, 1888.

Application filed June 16, 1887. Serial No. 241,529. (No specimens.)

*To all whom it may concern:*

Be it known that I, GEORGE WOOD, of Crawford, in the county of Delta and State of Colorado, have invented a new and Improved Medical Compound for Coughs and Colds, of which the following is a full, clear, and exact description.

This invention consists in a new and useful composition of matter or mixture for the cure of coughs and colds.

The composition consists of the following ingredients combined in or about the proportions stated, viz: extract of bloodroot, one half ($\frac{1}{2}$) ounce; essence of anise, one-half ($\frac{1}{2}$) ounce; essence of sassafras, one-half ($\frac{1}{2}$) ounce; essence of lobelia, one-half ($\frac{1}{2}$) ounce; tincture of Cayenne pepper, one-half ($\frac{1}{2}$) ounce, and tincture of myrrh, one-half ($\frac{1}{2}$) ounce. These ingredients are to be thoroughly mixed in a pint bottle filled with a simple sirup, and when combined constitute a perfectly safe and efficient remedy for coughs and colds even in the most acute and chronic cases, the same to be administered in or about the following quantities: Dose for adults, half of a tea-spoonful once every hour; dose for infants, two drops.

The qualities of the ingredients composing the mixture are as follows: The extract of bloodroot, in the quantity stated, acts as a stimulant and tonic; the essence of anise has a healing and soothing, also loosening, effect; the essence of sassafras is a purifier and thinner of the blood, and serves to cut the mucus and give general relief; the essence of lobelia exerts a peculiar action upon the trachea and bronchial vessels, expelling all collected mucus; the tincture of Cayenne pepper or capsicum produces heat and relaxation, also acts as a purifier, and the tincture of myrrh has a soothing and healing effect upon the bronchial and tracheal vessels.

Having thus fully described my invention, what I claim as new, and desire to secure by Letters Patent, is—

The herein-described compound or composition of matter to be used as a remedy for coughs and colds, consisting of the extract of bloodroot, essence of anise, essence of sassafras, essence of lobelia, tincture of Cayenne pepper or capsicum, and tincture of myrrh, in or about the proportions specified.

GEORGE WOOD.

Witnesses:
SAMUEL LORD,
M. I. FARRELL.